US007348479B1

(12) United States Patent
Lombardi

(10) Patent No.: US 7,348,479 B1
(45) Date of Patent: Mar. 25, 2008

(54) DRUM BEATING PRACTICE ASSEMBLY

(75) Inventor: Donald G. Lombardi, Westlake Village, CA (US)

(73) Assignee: Drum Workshop, Inc., Oxnard, CA (US)

(*) Notice: Subject to any disclaimer, the term of this patent is extended or adjusted under 35 U.S.C. 154(b) by 586 days.

(21) Appl. No.: 10/957,903

(22) Filed: Oct. 5, 2004

(51) Int. Cl.
*G01D 13/02* (2006.01)

(52) U.S. Cl. .................................................... 84/422.1

(58) Field of Classification Search ............... 84/422.1, 84/422.2, 422.3, 411 P, 421
See application file for complete search history.

(56) References Cited

U.S. PATENT DOCUMENTS

| | | | | |
|---|---|---|---|---|
| 2,893,283 | A * | 7/1959 | Ippolito | 84/411 R |
| 3,433,115 | A * | 3/1969 | Kjelstrom | 84/411 R |

* cited by examiner

*Primary Examiner*—Kimberly Lockett
(74) *Attorney, Agent, or Firm*—William W. Haefliger

(57) ABSTRACT

A drum beating practice assembly, comprising a stand, and a beater striking pad carried by the stand; a sub-assembly including a swingable drum beater, a base, a foot actuated pedal on the base, and mechanism to displace the beater to strike the pad in response to foot activated pedal movement; and a coupler to adjustably and stably couple the stand to the sub-assembly whereby when the displaced beater repeatedly strikes the pad, the stand and sub-assembly remain adjustably coupled together.

12 Claims, 3 Drawing Sheets

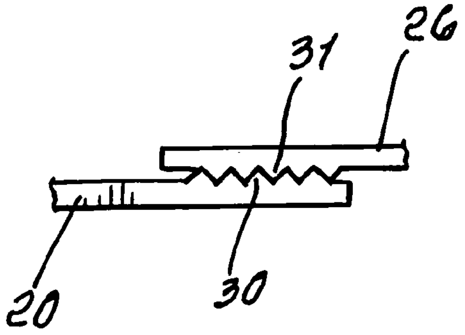
FIG. 2a.
FIG. 3.
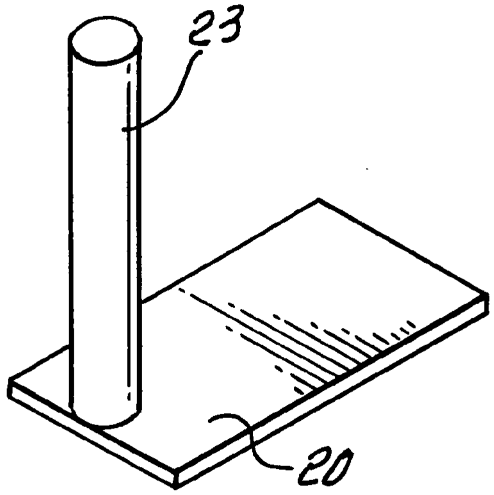
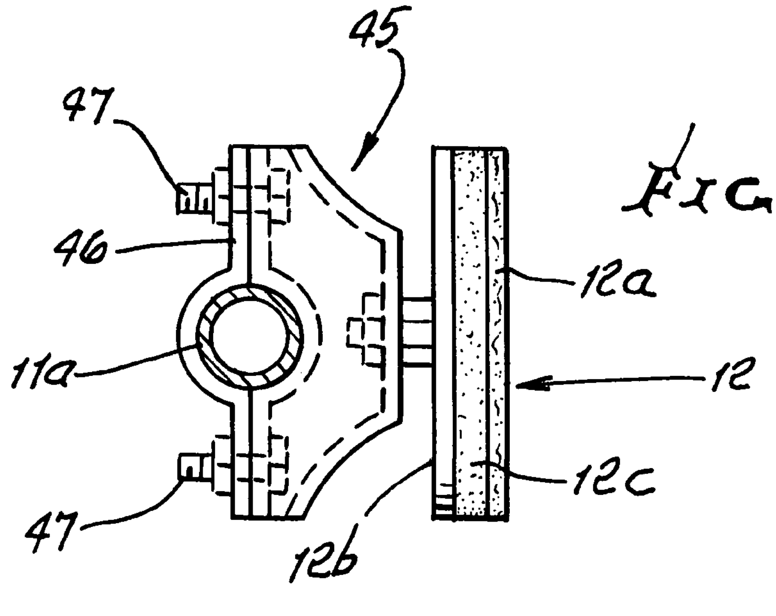
FIG. 4.

DRUM BEATING PRACTICE ASSEMBLY

BACKGROUND OF THE INVENTION

This invention relates generally to apparatus enabling use of a drum beater unit for practice drumming, as via beater striking of a practice pad or pads; and more particularly concerns coupling of a beater unit to a stand that carries a practice pad or pads in position for practice drumming, i.e. without need for a drum.

There is need for means to enable efficient, rapid and stable set up of a relatively small beater striking pad or pads in such relation to a drumming unit, including a swingable beater, as to enable repeated and rapid impact striking of the pad or pads while pad displacement away from the drumming unit is blocked. No prior apparatus of which I am aware provides the unusual structure, modes of operation and improved results as are now enabled by the present invention.

SUMMARY OF THE INVENTION

It is a major object of the invention to provide a drum beating assembly meeting the above need. Basically, the assembly of the invention comprises, in combination:

a) a stand, and a beater striking pad carried by the stand, b) a sub-assembly including a swingable drum beater, a base, a foot actuated pedal on the base, and mechanism to displace the beater to strike the pad in response to foot activated pedal movement, c) and a coupler to adjustably couple the stand to the sub-assembly whereby the displaced beater strikes the pad, and the stand and sub-assembly remain adjustably coupled together.

It is another object to provide a coupler that includes a clamp carried by the sub-assembly base, and a tongue carried by the stand and received by the clamp to be held in position by the clamp. The tongue may comprise a plate located at or near the lowermost extent of the stand, to extend generally horizontally toward and into the clamp.

A further object includes provision of a stable stand that has an upright shaft and three support legs acting to position the shaft vertically and resist stand displacement during beater impact, the coupler located at or near lowermost extent of the shaft.

Yet another object includes provision of i) a support on the stand to support the pad sidewardly of the stand, ii) an adjuster to adjust the vertical position of the support on the stand.

Typically, the pad is carried by the shaft proximate uppermost extents of the three legs whereby the pad is supported by the stand at a location resisting deflection of the pad relative to the sub-assembly.

An auxiliary object includes provision of a means for releasably coupling the sub-assembly to the stand to position the beater for repeatedly striking the pad while the pad remains supported against displacement.

A yet further object is to provide multiple drumming practice pads, at different orientations, on a stable stand, as referred to; and means to adjust the vertical position of the tongue relative to the stand.

These and other objects and advantages of the invention, as well as the details of an illustrative embodiment, will be more fully understood from the following specification and drawings, in which:

DRAWING DESCRIPTION

FIG. 2*a* is a fragmentary view of modified retention structure;

FIG. 3 is a perspective view of a coupler plate; and

Figure 2:
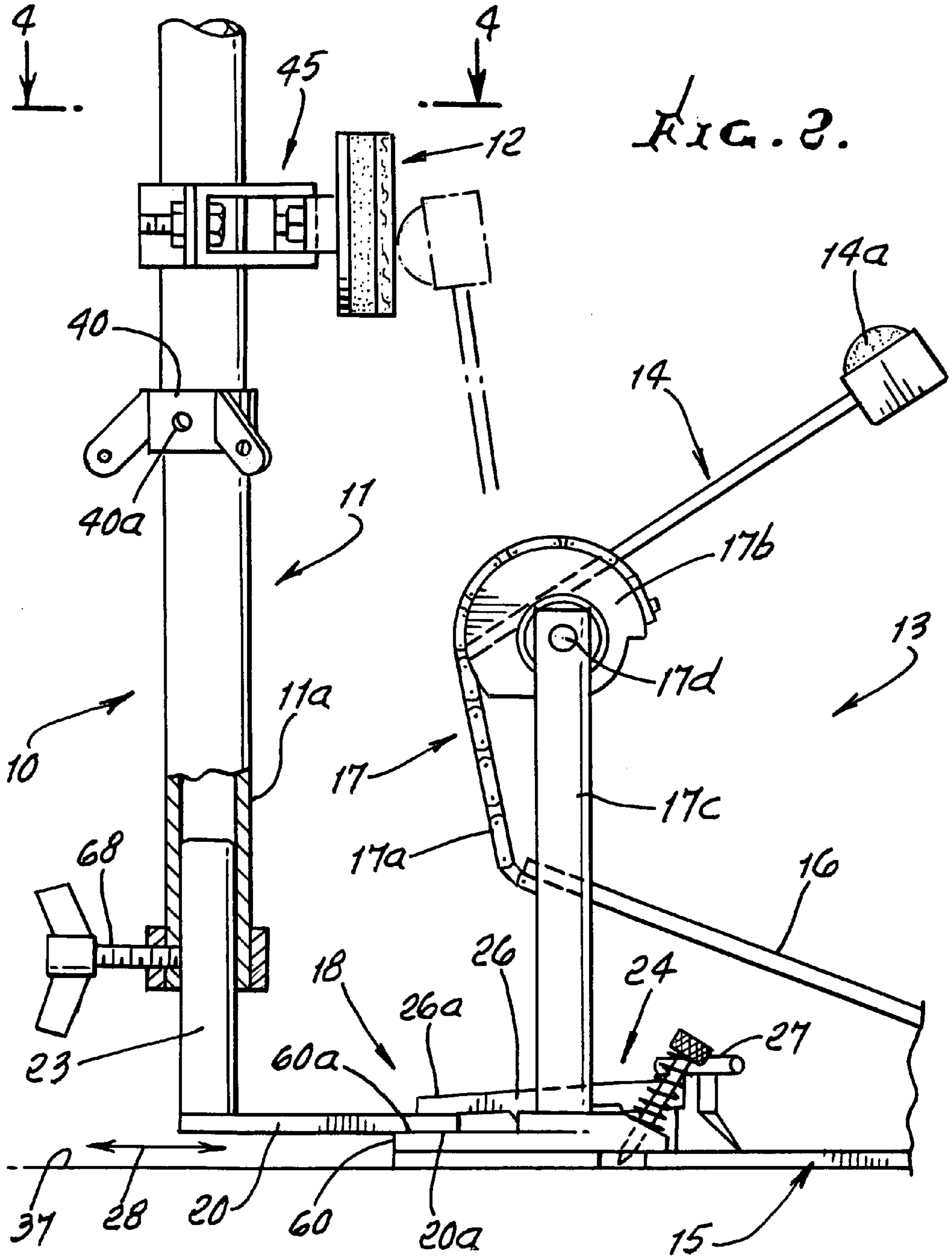
FIG. 2 is a side elevation view of the FIG. 1 apparatus.

FIG. 4 is a plan view taken in section on lines 4-4 of FIG. 2.

DETAILED DESCRIPTION

Figure 1:
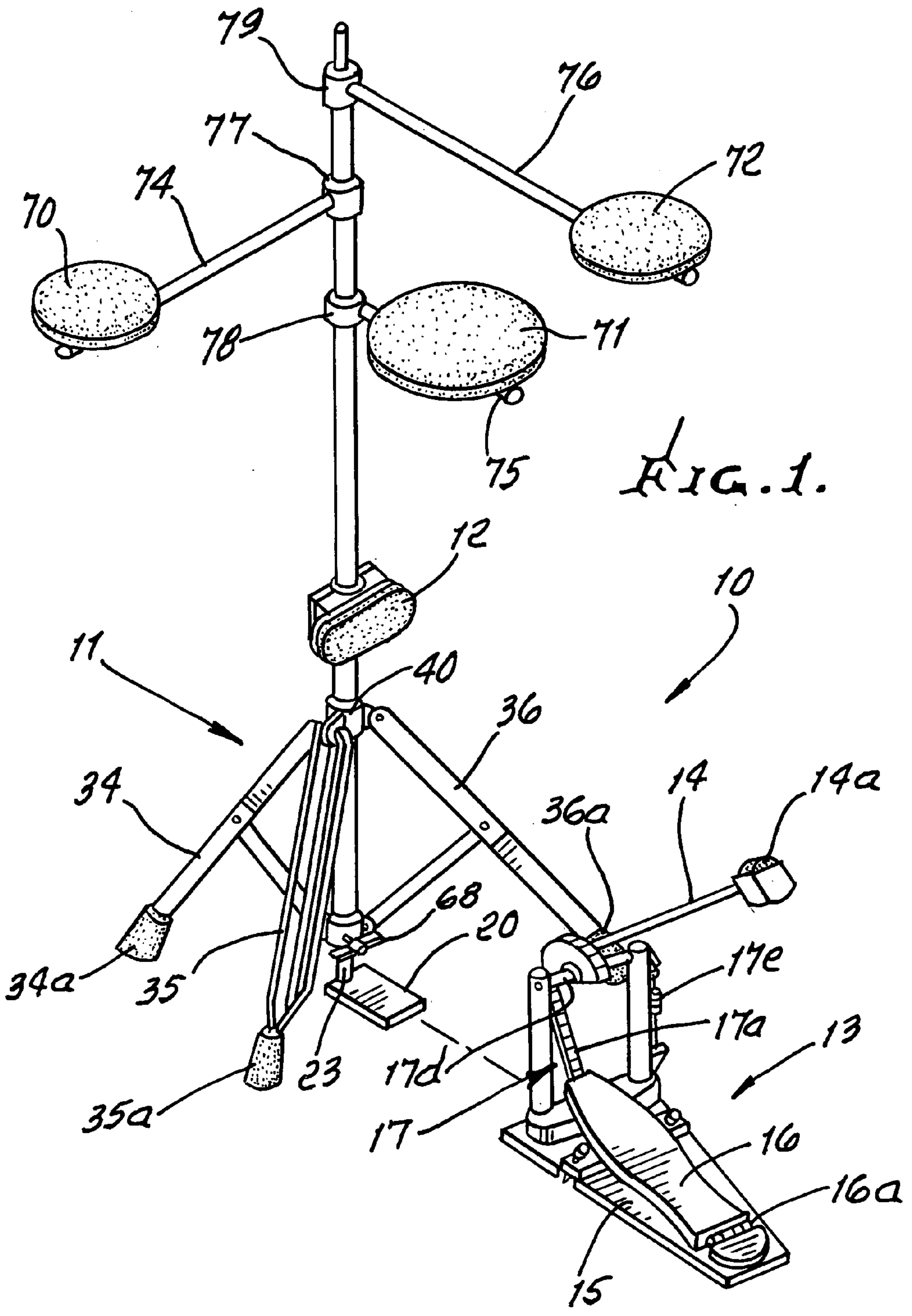
FIG. 1 is a perspective view of apparatus incorporating a preferred form of the invention.

In the drawings, a beating assembly or drum beating practice assembly, is shown in FIGS. 1 and 2 at 10. The assembly includes a stand 11, a beater striking pad 12 carried by the stand, a beater sub-assembly 13 that includes a swingable drum beater 14, with a head 14*a* to strike pad 12, a base 15, a foot activated pedal 16 pivotally connected to the base at 16*a*, and mechanism indicated at 17 to displace the beater toward the pad 12 in response to foot activated pedal movement. Mechanism 17 typically includes a chain 17*a* and sprocket 17*b*. See also upright 17*c*, axle 17*d*, and axle return spring 17*e*. In addition, a coupler 18 is provide to adjustably couple the stand 11 to the sub-assembly 13 whereby the displaced beater is located to strike the pad and the stand and sub-assembly remain coupled together.

FIG. 2 shows the coupler 18 to include a tongue 20 that projects generally horizontally toward and above the base 15 of sub-assembly 13. The tongue is carried at or near the lowermost extent of the stand, and particularly at or near the lowermost extent of a vertical shaft 23. See also FIG. 3, showing rigid attachment of 23 to 20.

The coupler also includes a clamp 24 carried by the base to receive and hold the tongue. The tongue is shown in the form of a rigid plate extending generally horizontally and having a lower side 20*a* engaging the upper side 60*a* of a support 60 on the base 15, for resisting displacement of the tongue plate relative to the base, as during drum beater impacting of the pad 12. Support 60 may be attached to the base and support upright 17*c*.

FIG. 2 shows the clamp 24 as including a holder or lever 26 retained downwardly toward the base by an adjuster 27, whereby the forward end 26*a* of the lever or holder exerts downward force on the tongue 20 to clamp it firmly against surface 60*a*. This arrangement also allows adjustment of the tongue position in horizontal directions indicated by arrows 28, relatively forward or away from the base. FIG. 2*a* shows the alternative provision of interengaged retention shoulders such as serrations 30 and 31 on the tongue and the lever.

The stand 11 is shown to preferably include three legs 34, 35, and 36 that diverge downwardly toward support feet 34*a*, 35*a* and 36*a* that engage a support surface 37 at spaced locations to stably block bending of the shaft 23 away from the sub-assembly 13 as during impact on the pad. Note that the pad 12 is carried by the shaft 23 proximate, and just above the slidable sleeve connection 40 of the leg upper ends to the shaft. The pad is adjustably connected to the shaft to permit its adjustment sliding up or down into position to receive beater impact, and to permit sleeve 40 displacement as during leg collapse toward the shaft, as during transport. Set screw 40*a* or other device holds the sleeve to the shaft.

FIGS. 2 and 4 show a pad support 45 adjustably clamped to the tube 11*a* as by clamp plate 46 and tightenable fasteners 47, to allow vertical adjustment of the pad 12, and rotary adjustment of the ad about the vertical axis of the stand. The pad 12 includes a striking layer 12*a*, typically non-metallic and a back-up support layer 12*b*, or layers, typically metallic. A cushioning layer is shown at 12*c*, between 12*a* and 12*b*. FIG. 2 also shows a height adjustment for shaft 23, allowing height adjustment of plate 20 relative to the base 15, for coupling to different sub-assemblies 13. Shaft 23 fits in a stand tube 11*a*, and is locked in position by set screw 68 projecting through the wall of 11*a* to engage the shaft. This allows for tongue plate adjustment relation to the clamp parts 60 and 26*a*.

FIG. 1 also shows upwardly facing beater practice pads 70-72 at different levels about pad 12, and supported by horizontally projecting support rods 74-76 connected at 77-79 to the upper extent of shaft 23. Connections 77-79 may be adjustable to allow elevation or lowering of pads 70-72, relative to pad 12.

I claim:

1. A drum beating practice assembly, comprising in combination:

a) a stand, and a beater striking pad carried by the stand, b) a sub-assembly including a swingable drum beater, a base, a foot actuated pedal on the base, and mechanism to displace the beater to strike the pad in response to foot activated pedal movement, c) and a coupler to adjustably and stably couple the stand to the sub-assembly whereby when the displaced beater repeatedly strikes the pad, the stand and sub-assembly remain adjustably coupled together, d) the coupler including a tightenable clamp carried by the base, the coupler including a tongue carried by the stand and received by the clamp to be held in position by the clamp.

2. The combination of claim 1 wherein the tongue is a plate located at or near the lowermost extent of the stand, to extend generally horizontally toward and into the clamp.

3. The combination of claim 1 wherein the tongue and clamp have interengageable locating shoulders.

4. The combination of claim 3 wherein said shoulders include serrations on one of the tongue and clamp.

5. The combination of claim 1 wherein the stand includes an upright shaft, and three support legs acting to position the shaft vertically and resist stand displacement during beater impact, the coupler located at a near lowermost extent of the shaft.

6. The combination of claim 5 including additional striker pads carried by the shaft, above the level of said pad.

7. The combination of claim 5 wherein said pad is located above the levels of said legs, there being additional striker pads carried by the shaft, above the level of said pad.

8. The combination of claim 5 wherein the pad projects away from the shaft, and toward the sub-assembly.

9. The combination of claim 1 including:

i) a support on the stand to support the pad sidewardly of the stand, ii) an adjuster to allow vertical adjustment of the vertical position of the support on the stand.

10. The combination of claim 5 wherein the pad is carried by the shaft proximate uppermost extents of the three legs whereby the pad is supported by the stand resisting deflection of the pad relative to the sub-assembly.

11. The combination of claim 5 wherein the stand includes a tube receiving the shaft, to be positioned in the tube for height adjustment of the tongue.

12. A drum beating practice assembly, comprising in combination:

a) a stand, and a beater striking pad carried by the stand, b) a sub-assembly including a swingable drum beater, a base, a foot actuated pedal on the base, and mechanism to displace the beater to strike the pad in response to foot activated pedal movement, c) and means for releasably coupling the sub-assembly to the stand to position the beater for repeatedly striking the pad while the pad remains supported against displacement, d) said means including a tongue and a clamp to hold the tongue and stand in selected position relative to the sub assembly, one of the tongue and clamp carried by the stand.

* * * * *